United States Patent
Liu et al.

(10) Patent No.: US 7,552,326 B2
(45) Date of Patent: Jun. 23, 2009

(54) USE OF KERNEL AUTHORIZATION DATA TO MAINTAIN SECURITY IN A DIGITAL PROCESSING SYSTEM

(75) Inventors: Zhengrong Liu, Foster City, CA (US); Harold Aaron Ludtke, San Jose, CA (US); Ikuo Shinozaki, Saitama (JP)

(73) Assignees: Sony Corporation, Tokyo (JP); Sony Electronics, Inc., Parkrigde, NJ (US)

( * ) Notice: Subject to any disclaimer, the term of this patent is extended or adjusted under 35 U.S.C. 154(b) by 976 days.

(21) Appl. No.: 10/893,763

(22) Filed: Jul. 15, 2004

(65) Prior Publication Data

US 2006/0015718 A1    Jan. 19, 2006

(51) Int. Cl.
   *H04L 9/00* (2006.01)
(52) U.S. Cl. ..................................... 713/164
(58) Field of Classification Search .................. 713/164
   See application file for complete search history.

(56) References Cited

U.S. PATENT DOCUMENTS

| | | | |
|---|---|---|---|
| 5,778,212 A | 7/1998 | Dehnert | |
| 6,334,213 B1 | 12/2001 | Le | |
| 6,708,330 B1 | 3/2004 | Moberg | |
| 6,859,932 B1 | 2/2005 | Shann | |
| 7,117,371 B1 | 10/2006 | Parthasarathy | |
| 7,143,289 B2 | 11/2006 | Denning | |
| 7,376,977 B2 | 5/2008 | Jindal | |
| 2002/0112158 A1 | 8/2002 | Golchikov | |
| 2003/0188179 A1* | 10/2003 | Challener et al. | 713/193 |
| 2004/0015884 A1 | 1/2004 | Shann | |
| 2005/0132031 A1 | 6/2005 | Sailer | |
| 2005/0204205 A1 | 9/2005 | Ring | |
| 2005/0262502 A1 | 11/2005 | Lari | |
| 2005/0273602 A1 | 12/2005 | Wilson | |
| 2006/0047958 A1 | 3/2006 | Morais | |
| 2007/0006150 A9* | 1/2007 | Walmsley | 717/120 |

OTHER PUBLICATIONS

Eric Youngdale, "Kernal Korner: The ELF Object File Format: Introduction", Specialized System Consultant, Inc. Linux Journal, vol. 95, Issues 12es, pp. 1-5.

Daniel Polistchuck, "Writing custom data to executable files in Windows and Linuz", Nov. 26, 2001, Retrieved from <http://dn.codegear.com>, pp. 1-6.

"Expanded Executable Loadable Format Operating Header", IBM Technical Disclosure Bulletin, Sep. 1995, pp. 1-5.

(Continued)

*Primary Examiner*—Kambiz Zand
*Assistant Examiner*—Aubrey H Wyszynski
(74) *Attorney, Agent, or Firm*—Brian N. Young; Trellis IP Law Group (57) ABSTRACT

A system to manage and control usage rights for cryptographic keys. A kernel process is provided with secure and exclusive authorization to access certain keys in a key hierarchy. Special authorization is required for other processes or users to access keys used by the kernel. A persistent storage area is used to hold a Kernel Authorization Data field for the root key and/or other keys used by the kernel or other specialized processes. The authorization data, and the keys it protects, can be used to protect other portions of, or the entire, key structure. The persistent storage area is reserved in a TPM or similar security hardware.

17 Claims, 3 Drawing Sheets

OTHER PUBLICATIONS

ITS Committee, Tool Interface Standard (TIS) Executable and Linking Format(ELF) Specification Version 1.2, Retrieved from <http://www.x89.org/ftp/manuals/tools/elf.pdf>, pp. 1-106.
"Executable and Linkable Format (ELF)", Retrieved from <http://skyfree.org/linux/references/ELF_Format.pdf>, pp. 1-60.
Marius Van Oers, "Linux Viruses—EFL File Format", Virus Bulletin Conference, Sep. 2000, pp. 1-20.
"Object Files", Retreived from <http://www.iecc.com/linker/linker03.html>, pp. 1-35.

* cited by examiner

USE OF KERNEL AUTHORIZATION DATA TO MAINTAIN SECURITY IN A DIGITAL PROCESSING SYSTEM

CROSS REFERENCE TO RELATED APPLICATIONS

This patent application is related to the following co-pending patent applications: U.S. patent application Ser. No. 10/893,129 filed on Jul. 15, 2004 entitled SYSTEM AND METHOD FOR STORING ATTRIBUTES IN A FILE FOR PROCESSING AN OPERATING SYSTEM; U.S. patent application Ser. No. 10/893,137 filed on Jul. 19, 2004 entitled ESTABLISHING A TRUSTED PLATFORM IN A DIGITAL PROCESSING SYSTEM; U.S. patent application Ser. No. 10/893,765 filed on Jul. 19, 2007 entitled SYSTEM AND METHOD FOR AUTHORIZING THE USE OF STORED INFORMATION IN AN OPERATING SYSTEM; and U.S. patent application Ser. No. 10/193,139 filed on Jul. 15, 2004 entitled PROCESSING SYSTEM USING INTERNAL DIGITAL SIGNATURES.

BACKGROUND OF THE INVENTION

This invention is related in general to digital processing systems and more specifically to enforcing security restrictions in a processing platform by using kernel authorization data to protect a root key in a key tree hierarchy.

In many of today's computing or processing applications it is desirable for a manufacturer, distributor or owner of content or information to be able to protect the content from misuse. For example, a Digital Versatile Disk (DVD) player is used by consumers to show movies and video that is typically proprietary. The owner of the movie content wishes to prevent a user from unauthorized copying, distribution or other handling of the content. Similarly, a compact disc (CD) player can have the same concerns with respect to music or other audio information. Other processing systems may have proprietary content in the form of software application programs, games, etc. In each of these cases protecting the content can be difficult since the processing platform (e.g., DVD player, CD player, game console, etc.) is under the control of the end user who typically operates the processing platform in their home.

One approach to ensuring protection of content is to create a "trusted platform" in a consumer playback device so that a consumer is restricted from misuse of the content. Such a trusted platform only allows known, or trusted, processes to execute so that undesirable functionality, such as undesirable copying of the content, is inhibited. A prior art approach to achieving a trusted platform includes standards promulgated by Trusted Computing Group (TCG, formerly Trusted Computing Platform Alliance (TCPA)) such as TCG Trusted Platform Module (TPM) v1.2 Specification Revision 62, Oct. 2, 2003. This specification design includes a hardware chip TPM and related functions that provide mechanisms to establish certain levels of trusts to local and remote platforms.

A TPM is integrated into a platform and protects a set of Platform Configuration Registers (PCRs) for storing runtime configurations of the platform. Platform configurations are measured (e.g., hashed) and extended (or accumulated) into PCRs. TCG specifies some protected functions for applications to query platform configurations. Using these functions, an application is able to acquire configurations for local or remote platforms.

A trusted chain is established by measuring platform configurations and extending the values to PCRs during a boot sequence. At platform power-on or reset, a root process of the trust module measures system hardware and firmware configurations including the Initial Program Loader (IPL or operating system (OS) loader). The measurements are extended to PCRs before passing over the platform control to the OS loader. The OS loader, in turn, measures the kernel image and related configurations before handling over the system control to the kernel image.

Figure 1:
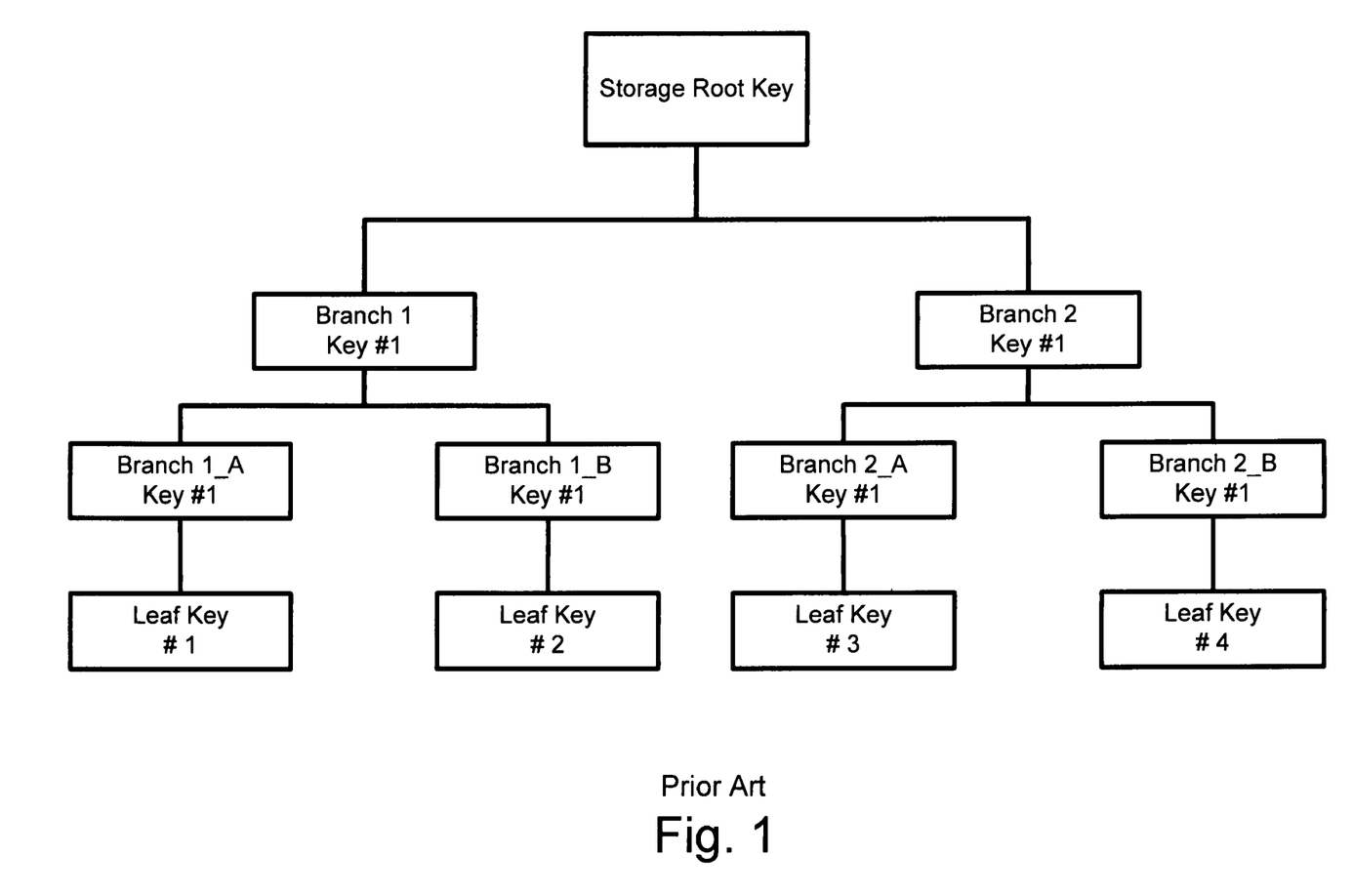
FIG. 1 is a prior art diagram of a key hierarchy.

One of the tasks of a TPM is to manage and control the use of cryptographic keys. In a trusted platform, the security of the system depends on the level of protection of its keys. The keys are managed in the form of a tree. The root key is the master and all keys below exist on the respective branches and leaves. An example of this is shown in FIG. 1. Based on the key hierarchy, use of a leaf key requires having proper authorization for all keys above (i.e., up to and including) the leaf key. The better that the system can protect the authorization data for the keys, the stronger the key security will be for the trusted platform. The Storage Root Key (SRK) is the authorization point for the other keys and requires knowledge of SRK authorization data in order to use the SRK.

Consumer electronic devices used by end-users present difficult problems in maintaining security. Usually such devices (e.g., DVD players, CD players, personal computers, cell phones, etc.) are under the complete control of an end user. Often it is desirable to protect content (e.g., movies, audio, etc.) that is accessed by, or played back on, these devices. In these end-user cases where the trusted platform is easily manipulated, protection of keys is very important yet difficult to achieve. In the end-user applications it is usually the platform (i.e., device) owner or user who has the knowledge of the authorization data. However, the content owner usually desires protection against the platform owner or user.

BRIEF SUMMARY OF THE INVENTION

A preferred embodiment of the invention uses a kernel process to manage and control usage rights for cryptographic keys in a processing system, or platform. The kernel is provided with secure and exclusive authorization to access certain keys in a key hierarchy. Special authorization is required for other processes or users to access keys used by the kernel.

A persistent storage area is used to hold a Kernel Authorization Data (KAD) field for the root key and/or other keys used by the kernel or other specialized processes. The authorization data, and the keys it protects, can be used to protect other portions of, or the entire, key structure. The persistent storage area is reserved in a TPM or similar security hardware.

In one embodiment the invention provides a method for secure processing in a processing system, the method comprising storing authorization data; performing a startup procedure; using a kernel process to obtain the stored authorization data; and using the stored authorization data to obtain a key for use in securing the processing system.

In another embodiment the invention provides an apparatus for secure processing in a processing system, the apparatus comprising a processor; a storage medium including instructions executable by the processor for storing authorization data; performing a startup procedure; using a kernel process to obtain the stored authorization data; and using the stored authorization data to obtain a key for use in securing the processing system.

In another embodiment the invention provides a machine-readable medium including instructions for achieving secure processing in a processing system, the machine-readable medium including one or more instructions for storing authorization data; one or more instructions for performing a startup procedure; one or more instructions for using a kernel process to obtain the stored authorization data; and one or more instructions for using the stored authorization data to obtain a key for use in securing the processing system.

DETAILED DESCRIPTION OF THE INVENTION

A preferred embodiment of the invention uses a kernel process to manage and control usage rights for cryptographic keys in a processing system, or platform. The kernel is provided with secure and exclusive authorization to access keys in a key hierarchy, including the SRK, by reading Kernel Authorization Data (KAD) from a secure storage location. The KAD (e.g. a key) is used to obtain the SRK and to grant rights to use other keys in the key hierarchy to other processes.

Figure 2:
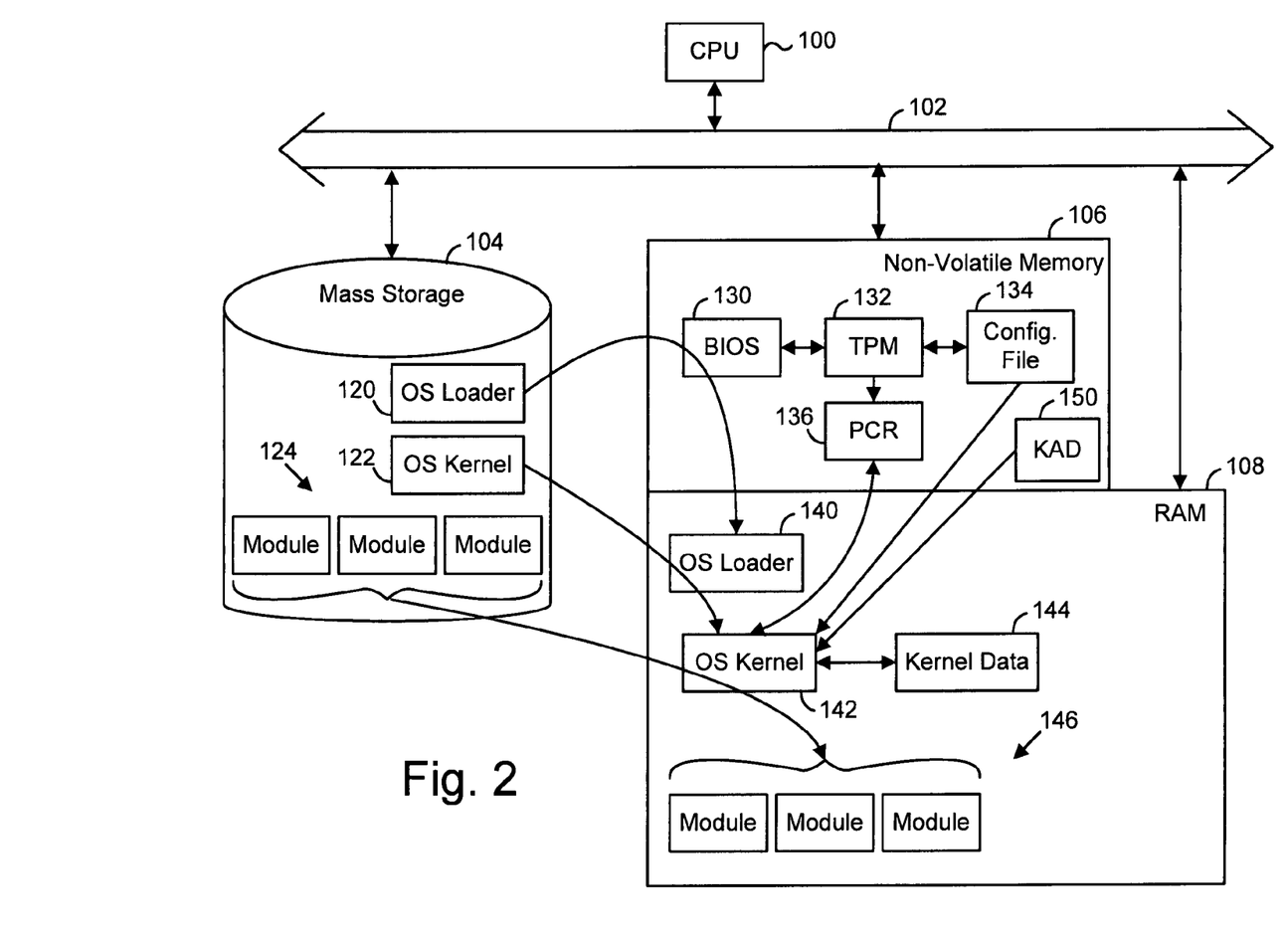
FIG. 2 shows basic hardware and software used in a startup procedure of a digital processing platform.
Figure 3:
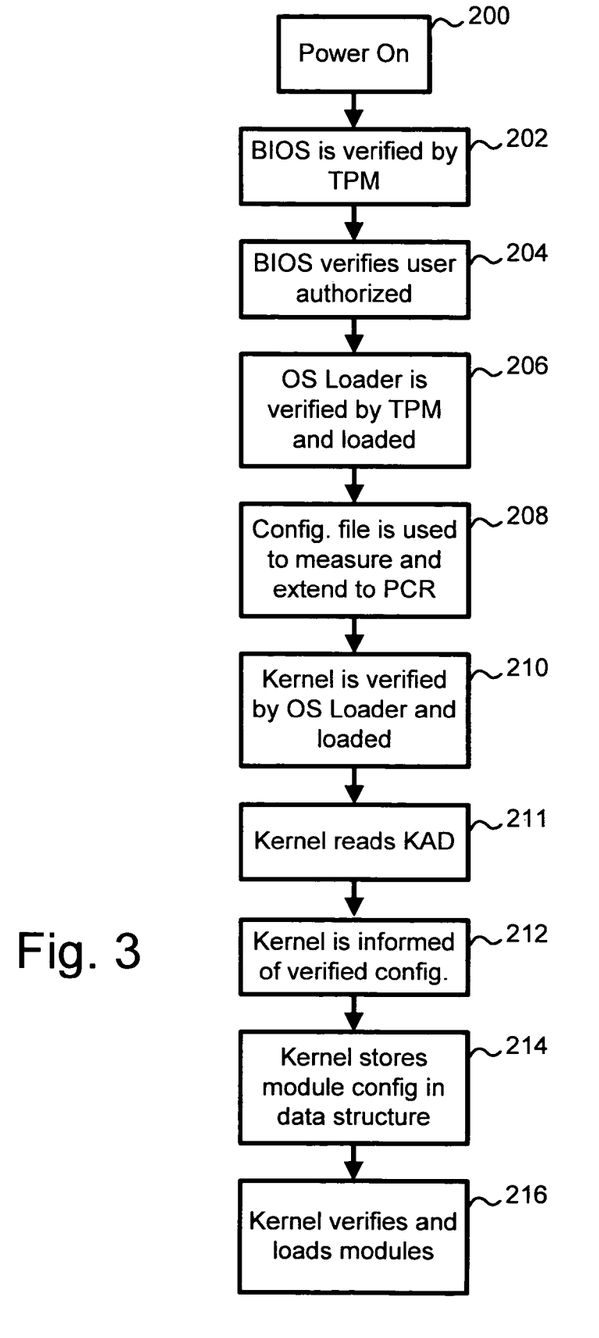
FIG. 3 shows basic steps in a boot sequence according to the present invention.

The kernel obtains the KAD as soon as possible in the boot sequence. FIGS. 2 and 3 are discussed, below, to illustrate possible points in a boot procedure where the kernel might obtain the KAD. A persistent storage area is used to hold KAD data for the root key and/or other keys used by the kernel or other specialized processes. The authorization data, and the keys it protects, can be used to protect other portions of, or the entire, key structure. The persistent storage area is reserved in a TPM or similar security hardware and, in a preferred embodiment, is loaded by a manufacturer or other trusted entity prior to shipping a device to an end user.

FIG. 2 is a diagram showing basic hardware and software used in a startup procedure, or "boot sequence" of a digital processing platform. The platform can be any type of processing device such as a DVD player, television, personal computer, etc. In general, any suitable type of architecture and allocation of processing among hardware and software can be suitable for use with the present invention. FIG. 2 is discussed in relation to the flowchart of FIG. 3, which describes the basic steps, or functionality, of a boot sequence designed to maintain the integrity of a trusted platform.

The device of FIG. 2 includes a central processing unit (CPU) 100, bus 102, mass storage 104, non-volatile memory 106 and random access memory (RAM) 108. CPU 100 is in communication with the other device components via the bus in a manner as is known in the art. Additional components can be present in other embodiments of the invention. For example, an input/output (I/O) subsystem, wireless communications system, direct memory access (DMA) controller, display adapter, keyboard and mouse controller, etc., can be used in different devices. Some devices may not use all of the components shown in FIG. 2, or may use components (either hardware or software) in varying number, type and arrangement. In general, any type of processing architecture can be sufficient for use with the present invention. A platform can use, for example, hardware and software components by Intel™ Corp., and Microsoft™, Inc. However, any other suitable platform components can be employed.

Mass storage 104 can be, for example, a hard disk drive unit. Other types of mass storage are possible such as a memory stick, CDROM drive, DVD drive, networked source, etc. Non-volatile memory can be any type of persistent memory. For example, read-only memory (ROM), flash memory, etc., can be used. Although specific types of storage media are presented, other embodiments can use other media types. The illustration of specific functionality stored in, or accessed from, a particular media type is not limiting of the present invention as other designs may effectively use any suitable type of storage medium.

Startup of a trusted platform occurs when a user turns on power to a device. A power-on step is shown at 200 of FIG. 3. Turning on power causes the subsequent steps of the flowchart to be executed by the processor to initiate a boot sequence to achieve a trusted platform. Initiation of the boot sequence can also be triggered by, e.g., a system reset, or by an external event, such as an instruction to restart the system upon detection of loss of trust in the system, detection of tampering or other events.

At step 202 of FIG. 3 the Basic Input-Output System (BIOS) is verified by TPM. In a preferred embodiment, BIOS verification can be performed according to the TCG Trusted Platform Module (TPM) v1.2 Specification Revision 62, Oct. 2, 2003 ("TPM Specification"), which is incorporated by reference as if set forth in full in this document. However, other types of verification can be performed in place of, or in addition to, those in the TPM Specification.

As described in the TPM Specification, to ensure system integrity for the trusted platform, "integrity metrics" are used. These include measurements of key platform characteristics that can be used to establish platform identity, such as BIOS, boot-loader, hardware configuration, OS loader, OS security policy and other characteristics. Cryptographic hashing, as is known in the art, is employed to extend trust from known trusted components to additional components as the boot sequence progresses. In a preferred embodiment, the measurements are extended to kernel modules and other modules that will be executed within the trusted platform. Critical applications that will be run within the trusted platform are monitored. Other kernel enhancements are used which are described in detail in the related patent applications referenced, above.

In the TPM Specification approach to security, a Core Root of Trust for Measurement (CRTM) is established to provide secure measurement functions. The TPM provides secure storage and measurement reporting along with other cryptographic services. The measurements the CRTM makes are based on the platform's architecture, therefore the CRTM remains platform dependent. Trusted support services can be provided to support secure I/O operations, cryptographic and other functions. In order to maintain the integrity of the trusted platform, both the CRTM and TPM must be protected against hardware and software attacks. The level of protection is specified in the particular platform's protection profile and is certified at manufacture. Upgrades and modifications are allowed only according to the manufacturer's (or whoever certifies the platform) instructions and authorization.

The CRTM measures integrity metrics during system initialization and during runtime. Integrity metrics include data reflecting the integrity of the software state. In the case of a PC, metrics can include the BIOS, MBR, and any other firmware bound to the board. The measurement is a hash of the software or firmware code. These measurements reflect the current state of the software (version, patch level, etc.). If the CRTM measurement of the BIOS code does not match a known value, the system may cease booting, or may boot and simply report the state as "not trusted" after the boot sequence is finalized.

The CRTM provides security throughout the boot and run process by extending its root of trust into a chain of trust, providing evidence that the system boot was carried out by trusted firmware. The CRTM first measures and reports on itself. Then it reports on the BIOS. The BIOS measures (via CRTM/TPM services) and loads the boot loader. The boot loader, in turn, measures the OS and the OS, can use the TPM at anytime to measure other applications. As long as software is measured and the result stored before execution, any unauthorized software cannot hide itself. If unauthorized software is present, it will be reflected in a measurement that is stored in the TPM.

The mechanics of measurement and storage provide methods to ensure that the reported values are reliable. The TPM contains (in protected storage) both a measurement log and Platform Configuration Registers (PCRs). The log contains a full history of all measurements and the PCRs contain values representing a sequence of measurements (but not the actual integrity metric).

At step 202, to verify and extend trust to the BIOS from the TPM, the TPM and BIOS communicate and BIOS 130 (of FIG. 2) is measured by TPM 132. The measurement (e.g., a hash) is extended (or stored) in TPM 132 and/or Platform Configuration Registers (PCRs) 136.

At step 206 of FIG. 3 the OS Loader is verified by TPM and is loaded. Note that although specific components are said to perform certain verification steps in the preferred embodiment, other embodiments can use different components to perform the specific verifications and the performance can occur at different times. In some applications, certain verification steps can be omitted and/or verification steps can be added. For example, step 206 may be performed by the BIOS (after the BIOS has been verified) or by another component, as desired.

FIG. 2 shows OS Loader 120 being loaded from mass storage by BIOS 130 into RAM 108 to create OS Loader instance 140. OS Loader 140 is then executed from RAM 108 by CPU 100.

In FIG. 3, step 208 is executed to measure and extend trust for modules to the PCR. Trusted modules are listed in a configuration file or data structure including the hash values for the modules. Configuration files are created separately, usually on different platforms. The configuration files typically list the hash values of trusted modules. The measurement of configuration files is extended in PCRs at the boot sequence not later than the kernel image. The data for the modules is extended, at least in part, to one or more values in the PCRs before a kernel begins executing. At step 210, OS Kernel 122 is verified by OS Loader instance 140 and is loaded into RAM 108 as OS Kernel instance 142. The loaded OS Kernel instance is allowed to execute to take control of the platform and verify modules 124 to be loaded (e.g., through standard "insmod" or "modprobe" routines). The OS Kernel instance is provided with data from configuration file 134 to indicate verified (i.e., "trusted") modules (step 212). The OS Kernel instance stores module configuration information in Kernel data structure 144 (step 214) and verifies each module against a hash in configuration file 134 before loading modules 124 and allowing the loaded modules to execute as module instances 146 (step 216). If an untrusted module is loaded the kernel changes the PCR values to indicate that the system is not trustable any more.

A boot process incorporating a kernel read of KAD 150 data can allow the kernel (or another process) to read the KAD at different times in the boot sequence. Embodiments of the invention contemplate a kernel read of KAD at a time occurring after steps 210, 212, 214 or 216 as shown in FIG. 3. In other words, the kernel can read the KAD after the kernel is verified and loaded by the OS loader (step 210); after the kernel is informed of a verified configuration (step 212); after the kernel stores module configuration information (step 214); or after the kernel has verified and loaded one or more modules (step 216). A preferred embodiment performs the KAD read at step 211 after step 210 when the kernel has been verified and loaded. In a preferred embodiment the KAD is read only once and thereafter further access to KAD data is electronically inhibited. Hardware can be provided to ensure that reading of the KAD is allowed only once upon power-on or other hard reset of the device. At each power-down, or reset, a flag that indicates that the KAD has been read is reset to allow for another single attempted read operation of the KAD at the next boot sequence.

In the preferred embodiment, platform configuration measurements are updated for use at run-time by client applications and other processes. New PCR values are available and are reflect the current state of the platform (i.e., trusted or non-trusted) for processes executing after the boot sequence completes. Thus, any non-trusted extension to the kernel (e.g., as a result of intruder or hacker actions) is reflected dynamically in ongoing PCR queries. Client applications can determine if the platform is trustable based on the return of PCR values.

The preferred embodiment uses the configuration file to protect the integrities of the trusted modules. The stored hash value of the configuration file in a PCR protects the "signatures" of the configuration file and modules. Digital signatures can also be used to protect integrities of modules, thus providing flexibility for introducing new modules and upgrading existing modules. Thus, integrity of new modules can be achieved in a self-contained device.

In alternative embodiments, a system can implement both a hash table for kernel modules that are unlikely to be changed in the short term, and a digital signature mechanism for other modules, such as third party kernel modules. Any executable code, data files, program objects or other information can be included in a measurement. The security extensions afforded to modules, described above, can be applied to any type of function or information in a processing system to ensure the integrity of a trusted platform beyond the initial boot sequence. For example, user space entities for critical applications (such as an "init" program) and libraries. For example, additional tables or files, similar to the module configuration file, can be maintained and can be extended to a PCR in the manner described for the configuration file.

In a preferred embodiment, the kernel maintains the integrity of the configuration files. In other embodiments it may be useful to use digital signatures that are checked by an outside authentication source to protect the integrities for user space entities because such entities are more likely to be changed from time-to-time such as when a user upgrades a software package. In cases where user space entities need to be checked network connections are usually more accessible (as opposed to during a boot sequence) and needed network modules would already be loaded.

Another mechanism to extend a trusted platform with additional libraries and software is though using of Extended Executable Linking Format (EELF) discussed in the related patents reference above. In that mechanism, trusted software includes a self-signed attachment, the EELF, which provides signature for verification of the software. This mechanism can be used to establish a trusted platform, or in combination with the invention to provide a flexible trusted platform.

Although the invention has been described with respect to specific embodiments thereof, these embodiments are merely illustrative, and not restrictive, of the invention. For example, although a preferred embodiment of the invention discussed above uses a TPM to store, check PCRs and release the KAD, an alternative implementation can "seal" the KAD to the PCR values. For example, a type of sealing operation is defined in the TCG specifications. The sealing operation takes place inside of TPM and can only be unsealed in the same TPM with the same PCR configuration. Thus, this approach can be compatible with current TCG specifications. The authorization data for an unsealing process can be protected, as desired. This approach does not need to restrict the KAD from being read more than once.

Although the invention may be presented with respect to a specific hardware device, such as a DVD player, audio player, computer system, etc., any suitable type of hardware or device can be used with the present invention. Also, although specific processes such as a boot-loader, kernel, operating system, application, service, TCG, etc., may be mentioned, in general any type of process or combination of software and hardware may be used to achieve the desired functionality. In general, other embodiments can use any number of processes, modules, or other program or data-structures or organizations. Although the invention may be discussed primarily with respect to specific media types such as optical, magnetic, solid state, etc., any type of storage media type, information source or device can be used.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Although specific types and numbers of tools, utilities, routines or other programs and functionality has been presented, the functionality provided by embodiments of the invention can be provided by many different design approaches. For example, more or less than six tools can be used. A different ordering of functions (i.e., tool execution) may be desirable in different embodiments. Different designs can include combined functionality of several tools into one, or functions can be allocated to more than six tools. It may be possible and desirable to omit functions described herein in some embodiments. Different embodiments can include more or less automation and more or less manual intervention. Features can be added, deleted, or modified, as, for example, to accommodate future computer operating systems, applications, utilities, drivers or other components.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for secure processing in a processing system, the method comprising
   storing authorization data in a trusted platform module (TPM);
   performing a startup procedure;
   verifying a kernel process to verify that the kernel is trusted by the processing system;
   loading the kernel process;
   using the kernel process to obtain the stored authorization data from the trusted platform module, the authorization data being released by the TPM to the kernel process if the kernel process has been verified; and
   using the kernel process access a storage root key in a key hierarchy using the obtained authorization data, the storage root key for use in securing the processing system.

2. The method of claim 1, wherein the authorization data is stored in a persistent storage location.

3. The method of claim 1, further comprising
   granting rights to a leaf key in the key hierarchy using the storage root key; and
   using the leaf key to secure the module in the processing system.

4. The method of claim 1, wherein "using a kernel process to obtain the stored authorization data" is performed after the kernel process is verified and loaded.

5. The method of claim 1, wherein "using a kernel process to obtain the stored authorization data" is performed after the kernel process is informed of a verified configuration.

6. The method of claim 1, wherein "using a kernel process to obtain the stored authorization data" is performed after the kernel process stores module configuration information.

7. The method of claim 1, wherein "using a kernel process to obtain the stored authorization data" is performed after the kernel process has verified and loaded one or more modules.

8. The method of claim 1, further comprising:
   using a configuration file to determine a value for the module;
   using the value to extend the value to a platform configuration register (PCR) for storing runtime configuration information in the TPM; and
   using the PCR to verify the module.

9. The method of claim 1, wherein access to the authorization data is allowed only once upon power on of the processing system.

10. The method of claim 1, further comprising;
    determining that a configuration of the processing system is verified;
    storing a module configuration; and
    verifying the module using the module configuration information.

11. The method of claim 1, wherein verifying the OS kernel comprises:
    verifying, using the TPM, an OS loader; and
    using the OS loader to verify the OS kernel and load the OS kernel.

12. The method of claim 1, further comprising:
    reading a configuration file to determine measurements for one or more modules;
    extending the measurements for the one or more modules into PCRs in the TPM.

13. The method of claim 1, further comprising:
    using the OS Kernel to verify the one or more modules using the measurements;
    loading the one or more modules if the one or more modules are verified.

14. The method of claim 13, further comprising changing the extended measurements in the PCRs in the TPM if the one or more modules are not verified to indicate the processing system is not trusted.

15. An apparatus for secure processing in a processing system, the apparatus comprising
    a processor;
    a storage medium including instructions executable by the processor for storing authorization data in a trusted platform module (TPM);
    performing a startup procedure;
    verifying a kernel process to verify that the kernel is trusted by the processing system;
    loading the kernel process;
    using the kernel process to obtain the stored authorization data from the trusted platform module, the authorization data being released by the TPM to the kernel process if the kernel process has been verified; and
    using the kernel process access a storage root key in a key hierarchy using the obtained authorization data, the storage root key for use in securing the processing system.

16. A machine-readable medium including instructions for achieving secure processing in a processing system, the machine-readable medium including
    one or more instructions for storing authorization data in a trusted platform module (TPM);
    one or more instructions for performing a startup procedure;
    one or more instructions for verifying a kernel process to verify that the kernel is trusted by the processing system;
    one or more instructions for loading the kernel process;
    one or more instructions for using the kernel process to obtain the stored authorization data from the trusted platform module, the authorization data being released by the TPM to the kernel process if the kernel process has been verified; and
    one or more instructions for using the kernel process to access a storage root key in a key hierarchy using the obtained authorization data, the storage root key for use in securing the processing system.

17. An apparatus for secure processing in a processing system, the apparatus comprising logic configured to store authorization data in a trusted platform module (TPM);

logic configured to perform a startup procedure;

logic configured to verify a kernel process to verify that the kernel is trusted by the processing system;

logic configured to load the kernel process;

logic configured to use the kernel process to obtain the stored authorization data from the trusted platform module, the authorization data being released by the TPM to the kernel process if the kernel process has been verified; and logic configured to use the kernel process to access storage root key a key hierarchy using the obtained authorization data, the storage root key for use in securing the processing system.

* * * * *

UNITED STATES PATENT AND TRADEMARK OFFICE
CERTIFICATE OF CORRECTION

PATENT NO. : 7,552,326 B2  Page 1 of 1
APPLICATION NO. : 10/893763
DATED : June 23, 2009
INVENTOR(S) : Liu et al.

It is certified that error appears in the above-identified patent and that said Letters Patent is hereby corrected as shown below:

Column 1, Line 13, delete "July 19, 2004" - add "July 15, 2004"
Column 1, Line 16, delete "July 19, 2007" - add "July 15, 2004"
Column 1, Line 19, delete "10/193,139" - add "10/893,139"

Signed and Sealed this

Sixteenth Day of February, 2010

David J. Kappos
*Director of the United States Patent and Trademark Office*